Oct. 6, 1959 F. J. FURMAN ET AL 2,907,270

WIRE PRINTER

Filed Dec. 31, 1954 9 Sheets-Sheet 1

Oct. 6, 1959 F. J. FURMAN ET AL 2,907,270

WIRE PRINTER

Filed Dec. 31, 1954 9 Sheets-Sheet 2

INVENTORS
FRANK J. FURMAN
OTTO F. MONEAGLE
ROBERT V. SIMPSON
BY
Joseph B. Taphorn
ATTORNEY Oct. 6, 1959

F. J. FURMAN ET AL 2,907,270

WIRE PRINTER

Filed Dec. 31, 1954

9 Sheets-Sheet 4

INVENTORS
FRANK J. FURMAN
OTTO F. MONEAGLE
ROBERT V. SIMPSON
BY Joseph B. Paphorn
ATTORNEY

WIRE PRINTER

Filed Dec. 31, 1954 9 Sheets-Sheet 5

INVENTORS
FRANK J. FURMAN
OTTO F. MONEAGLE
ROBERT V. SIMPSON

BY

Joseph B. Taphorn
ATTORNEY

Oct. 6, 1959 F. J. FURMAN ET AL 2,907,270

WIRE PRINTER

Filed Dec. 31, 1954 9 Sheets-Sheet 6

INVENTORS
FRANK J. FURMAN
OTTO F. MONEAGLE
BY ROBERT V. SIMPSON
Joseph B. Papham
ATTORNEY

*INVENTORS*
FRANK J. FURMAN
OTTO F. MONEAGLE
ROBERT V. SIMPSON

*BY*

Joseph B. Taphorn
ATTORNEY

Oct. 6, 1959 F. J. FURMAN ET AL 2,907,270

WIRE PRINTER

Filed Dec. 31, 1954

9 Sheets-Sheet 8

INVENTORS
FRANK J. FURMAN
OTTO F. MONEAGLE
ROBERT V. SIMPSON

BY Joseph B. Tafhorn
ATTORNEY

Oct. 6, 1959 F. J. FURMAN ET AL 2,907,270

WIRE PRINTER

Filed Dec. 31, 1954 9 Sheets-Sheet 9

INVENTORS
FRANK J. FURMAN
OTTO F. MONEAGLE
ROBERT V. SIMPSON

BY Joseph B. Papham
ATTORNEY

United States Patent Office 2,907,270

Patented Oct. 6, 1959

2,907,270

WIRE PRINTER

Frank J. Furman and Otto F. Moneagle, Endicott, and Robert V. Simpson, Owego, N.Y., assignors to International Business Machines Corporation, New York, N.Y., a corporation of New York Application December 31, 1954, Serial No. 479,106

23 Claims. (Cl. 101—93)

This invention relates to printers and more particularly to wire printers capable of printing successive lines of text.

Wire printers of the type mentioned are disclosed in the patent application, Serial No. 255,391, of Reynold B. Johnson, filed November 8, 1951, now U.S. Patent No. 2,730,040. In the printers disclosed in that application, a plurality of print mechanisms are mounted across the machine for simultaneous operation and printing on a recording material. Each of the print mechanisms includes a plurality of print wires respectively mounted in channels formed in a guide plate. The channels in the guide plates converge so that the wires project from one end thereof in a matrix upon which a character pattern may be formed. This character pattern is formed by moving the wires relative to a code rod so that they will be preset by the time the print ends thereof are engaged by recording material mounted upon a movable platen.

Since then the system of slidably mounting print wires in channels formed in guide plates has been superseded by a system in which the print wires are slidably mounted in flexible guide tubes. This system is disclosed in the copending application, Serial No. 384,697, of Reynold B. Johnson, filed October 7, 1953, now U.S. Patent No. 2,785,627. Moreover, as is shown in that application, printing is no longer accomplished by moving the platen and the recording material to the print ends of the print wires, but rather by moving the ends of the tubes adjacent the print wires towards the platen so that projecting ends of the preset print wires strike the recording material to impress a character pattern, thereby enabling an increase in speed as parts of considerably less mass and hence lower inertia are moved. As is further shown in that application, the mounting of the print wires and guide tubes also facilitates printing in adjacent character positions.

As a result of the high speeds obtainable in the improved printers, it is possible to reduce the cost of construction while yet obtaining printers capable of operating at the requisite speed levels. This is accomplished by providing only one print mechanism for each of several character positions; thus a series of cycles is necessary in order to print each line of text. This type of operation is disclosed in the copending application, Serial No. 462,001, of Reynold B. Johnson, filed October 13, 1954, now U.S. Patent No. 2,802,474.

It is an object of this invention to simplify the construction and assembly of printers embodying the desirable features mentioned above.

In operation, wire printers of the type disclosed in the above identified applications occasionally print characters whose component dots at one end were heavier than those at the other end. Hence, there resulted a printing of non-uniform weight and objectionable quality. Accordingly, it is another object of this invention to provide a wire printing mechanism wherein the weight of printing, top and bottom can be accurately controlled.

In the printer disclosed in the patent application, Serial

No. 255,391, the code rod positioning mechanism restores to zero between successive settings. Not only does such a mechanism require additional time for successive settings, thus lengthening the cycles, but the added travel imposed on the parts causes additional wear and tear, thus leading to earlier breakdown of the positioning mechanism. Non-return to zero mechanisms are already known. The Beattie Patent No. 2,661,683 shows such a mechanism. However, that mechanism is lacking in the precision necessary for the proper positioning of a code rod in a high-speed wire printer, due in part to the excessive lengths of the cables by which the mechanism is connected to the element to be indexed. Thus, another object of the invention is to provide a satisfactory code rod positioning mechanism embodying a non-return to zero mechanism so that the code rod may be shifted directly from one position to the next, without passing through the zero position, for successive settings.

It has been common for some time, when using continuous form documents, to provide for the vernier adjustment of the paper on a carriage in relation to the print line determined by the character forming elements of a printer. Such devices have been mounted on the paper carriage to cooperate with the form feed device. However, when used in high speed printers, their mass introduces such inertia as to make form feeding a problem. Hence, it is another object of this invention to provide a vernier adjustment of the print line relative to the paper that is satisfactory for use in high speed printers.

According to the invention, the print wires and the code bar guide housing of each print mechanism are now preassembled into one structural unit. The print wires for a print mechanism are mounted on one side of a readily insertable and removable print plate by mounting the lower ends of the guide tubes for the respective print wires thereon. The code bar guide housing is slidably mounted on this print plate, enabling the respective print wires to be inserted into the proper openings in the guide housing while the unit is still out of the machine. This bench assembling facilitates the testing and adjusting of each print mechanism so that when it is finally placed in the machine, the only critical thing that obtains is the matching of broad surface lugs on the code bar housing with broad-faced operating elements in the printer. It can be seen that there thus obtains relatively broad tolerance, facilitating the construction of a printer. Moreover, such a construction lends itself to mass production, as many persons can be involved in the making of the print plate assemblies and only few need be concerned with the actual installation of the assemblies in the printer.

In practice it has been found expedient to assemble two print mechanisms into one unit. Thus, the print wires and their guide tubes for each print mechanism are mounted on the respective sides of a print plate, the free ends of the tubes being fixed to a corresponding print head. A code rod is provided for each print mechanism, but both are mounted in one code bar housing extending to both sides of the mounting print plate. The construction and assembly of the printer is further facilitated by mounting the positioning mechanisms for the two code rods on a print plate on a corresponding set-plate, which unit may be individually and readily inserted into the printer and connected with the code bar mechanisms on the print plate.

According to another feature of the invention, the code rod guide housing is rockably mounted on the corresponding print plate so that its position may at all times be determined by engagement with two operating elements respectively engaging it at its upper and lower ends. These operating elements, simultaneously moved towards and away from the housing, may be adjusted as to their positions relative to each other, and it results that the attitude of the code rod with respect to the control ends of the print wires may be adjusted. This adjustment enables the code rod to be so conditioned that it presets the print wires forming the character pattern equal amounts, thus preventing unequal printing of the component dots of the character pattern at the upper and lower ends thereof.

The invention further provides for the rapid and accurate indexing of each code rod to its various character-determining positions. Thus, the code rod positioning mechanisms on the set-up plates each comprise a non-return to zero mechanism which is advantageously connected to the corresponding code rod through a bank of wedges. Each bank of wedges consists of two units of three wedges each, respectively having the values of 1, 2, and 4 when moved to an effective position. It is a feature of this invention that each of these wedges has a positive displacement so that only a minimum of movement is entailed in moving the code rod from one position to another by merely advancing and restoring different wedges under the control of corresponding magnets.

Vernier adjustment of the print line with respect to the paper on a platen is obtained by taking advantage of the flexible mounting of the print heads for the respective wire printing mechanisms. The use of flexible tubes for guiding the print wires enables the print heads to be adjusted with relation to the rest of the print mechanism and to the paper. A fine eccentric adjustment, normally controllable by the operator whether the machine is in operation or at rest, is provided in the mounting of the print heads and is effective to raise or lower the print line as may be required with the particular forms involved.

Other objects, features, and advantages of the invention will be pointed out in the following description and claims and illustrated in the accompanying drawings, which disclose, by way of example, the principle of the invention and the best mode which has been contemplated of applying that principle.

In the drawings:

Fig. 1, when arranged with Fig. 1*b* to the right of Fig. 1*a*, is a vertical longitudinal sectional view through a wire printer constructed according to the instant invention.

*General*

Figure 1A:
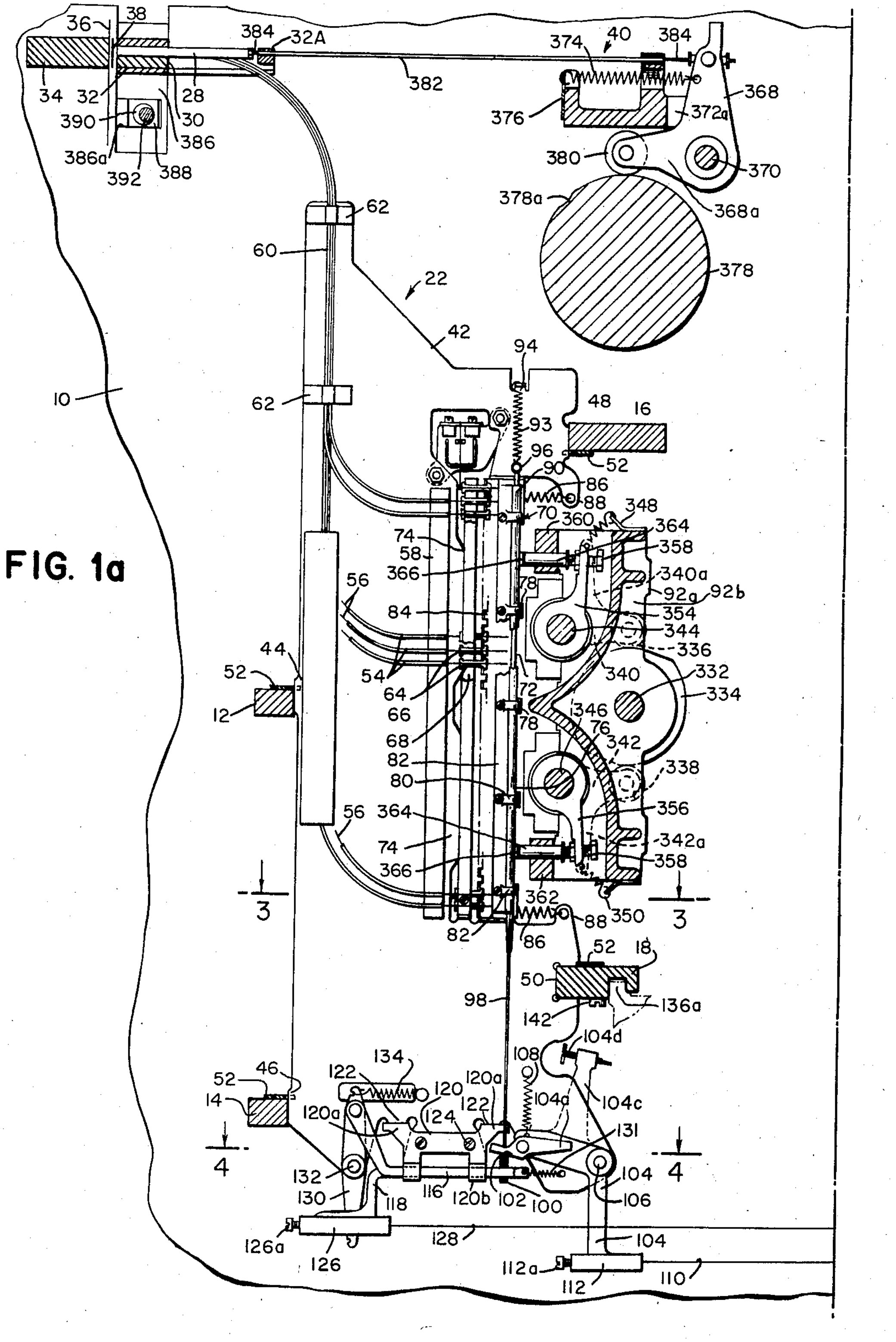

Referring more particularly to the drawings, the wire printer is shown therein as having a framework composed of side plates 10 which are interconnected by transverse bars 12, 14, 16, 18, and 20. The first four bars, in addition to bracing the side plates of the machine, are used to support print plate assemblies 22, by which the print mechanisms are mounted in the printer. The brace bars 18 and 20 are used to support set-up plate assemblies 24, of which there is one for each print plate assembly. The upper ends of the set-up plate assemblies are supported in the machine by being anchored to a set-up plate assemblies cam operating assembly 26 which is fixed to the side plates 10 of the printer. Each of the print plate assemblies is accompanied by a pair of print heads 28 which are, together with the remainder of the print heads for the other assemblies, slidably supported in a transversely extending member 30. This member may be slidably supported on a frame member to enable each print head to print several characters on a line in the manner more fully explained in the copending patent application, Serial No. 479,107, of Frank J. Furman, Henry A. Jurgens, Martin J. Kelly, and Theodore D. Koranye, filed December 31, 1954. The frame member is adjustably supported at its opposite ends upon the side plates 10 of the printer to provide for the vernier adjustment of the print line. Located rearwardly of the transversely extending carriage 30 is a platen 34 over the face of which a recording material 36, such as a strip of continuous forms, and an inking ribbon 38 may be moved. The movement of the print heads towards and away from the platen to effect printing is accomplished through a print head operating assembly 40 also anchored at its opposite ends upon the side plates 10 of the printer. It will thus be observed that the basic design of the printer entails the concept of unit construction. For example, the print plate assemblies 22 and set-up plate assemblies 26 are installed in the machine as preassembled and pretested units. There thus obtains in a printer of this kind an ease of assembly and construction, and it may be further noted that there remains to be made, in order to provide an operative whole, only a minimum of interconnections between the various components of the machine, thereby facilitating final and accurate adjustment.

*Print plate assemblies*

Each print plate assembly 22 comprises a generally flat plate 42 provided with bosses, 44, 46, and 48, by which it is located with respect to the transversely extending brace bars 12, 14, and 16. A print plate is also provided with a notch 50 by which it is seated on the brace bar 18, thus holding the print plate against gravitational displacement. Combs 52 on the respective brace bars locate the print plate assemblies transversely in the machine. It will be apparent that the installation and removal of a print plate assembly is a relatively easy task and that such work can be performed without disturbing the remainder of the printer components.

Figure 2:
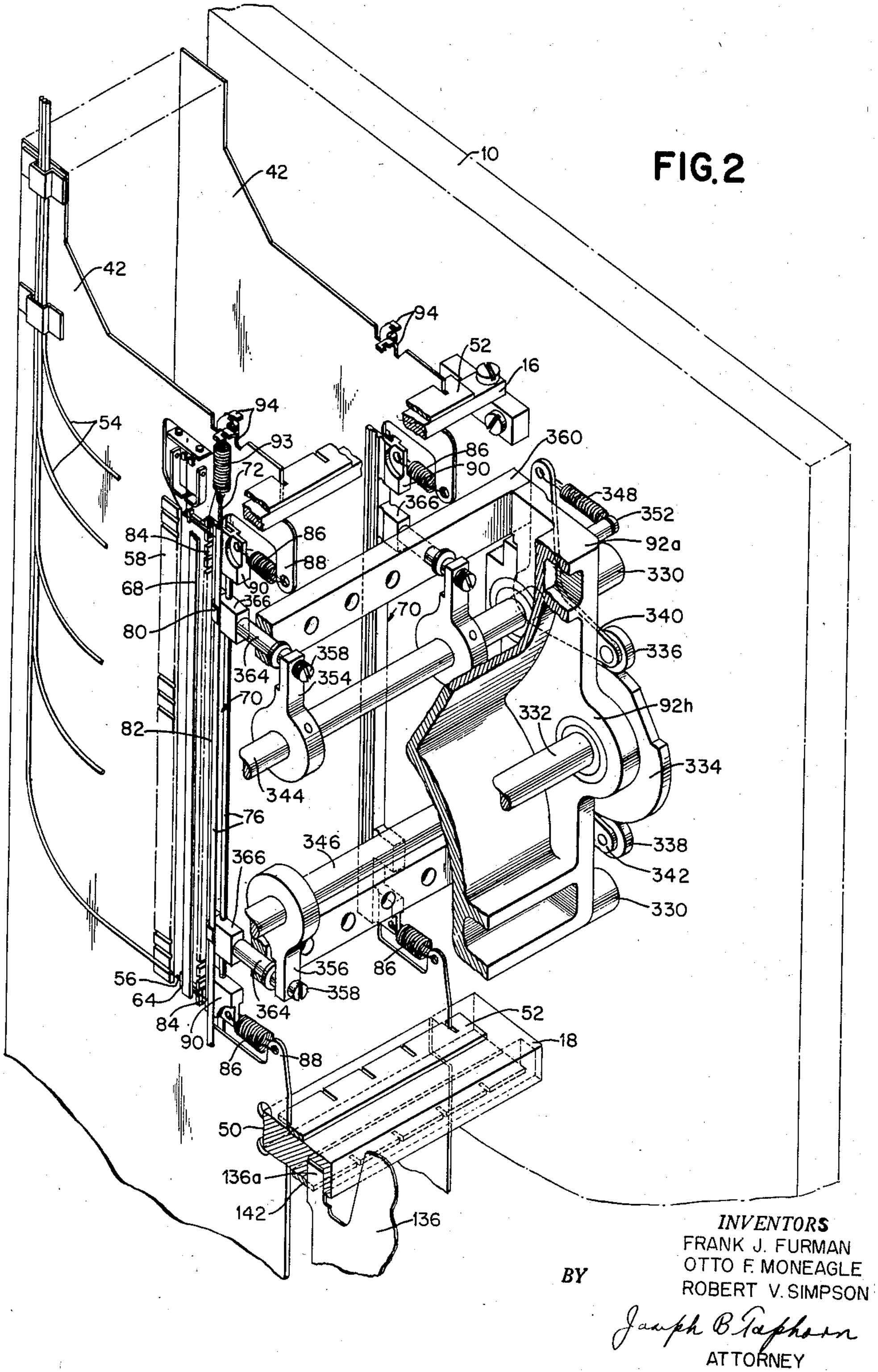
Fig. 2 is a view in perspective of a portion of the wire printer shown in Fig. 1*a*.
Figure 3:
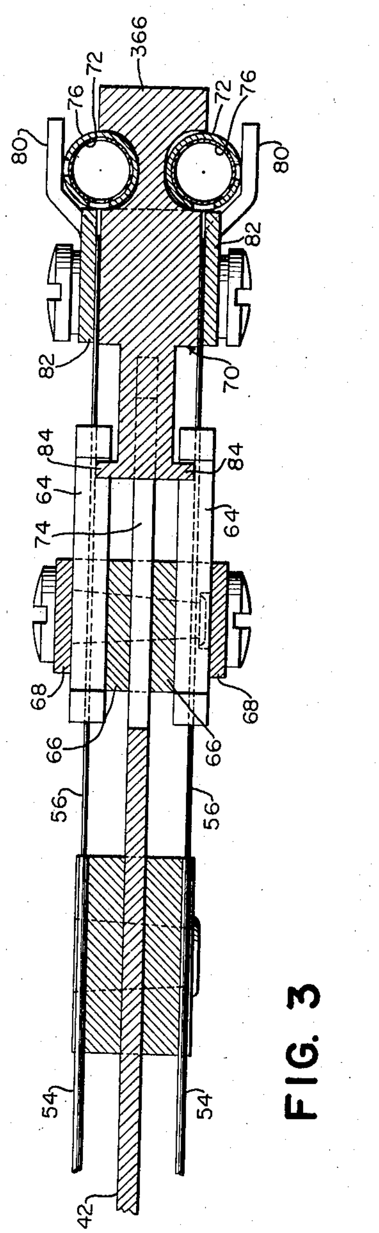
Fig. 3 is a view taken along the section line 3—3 of Fig. 1*a*.
Figure 5:
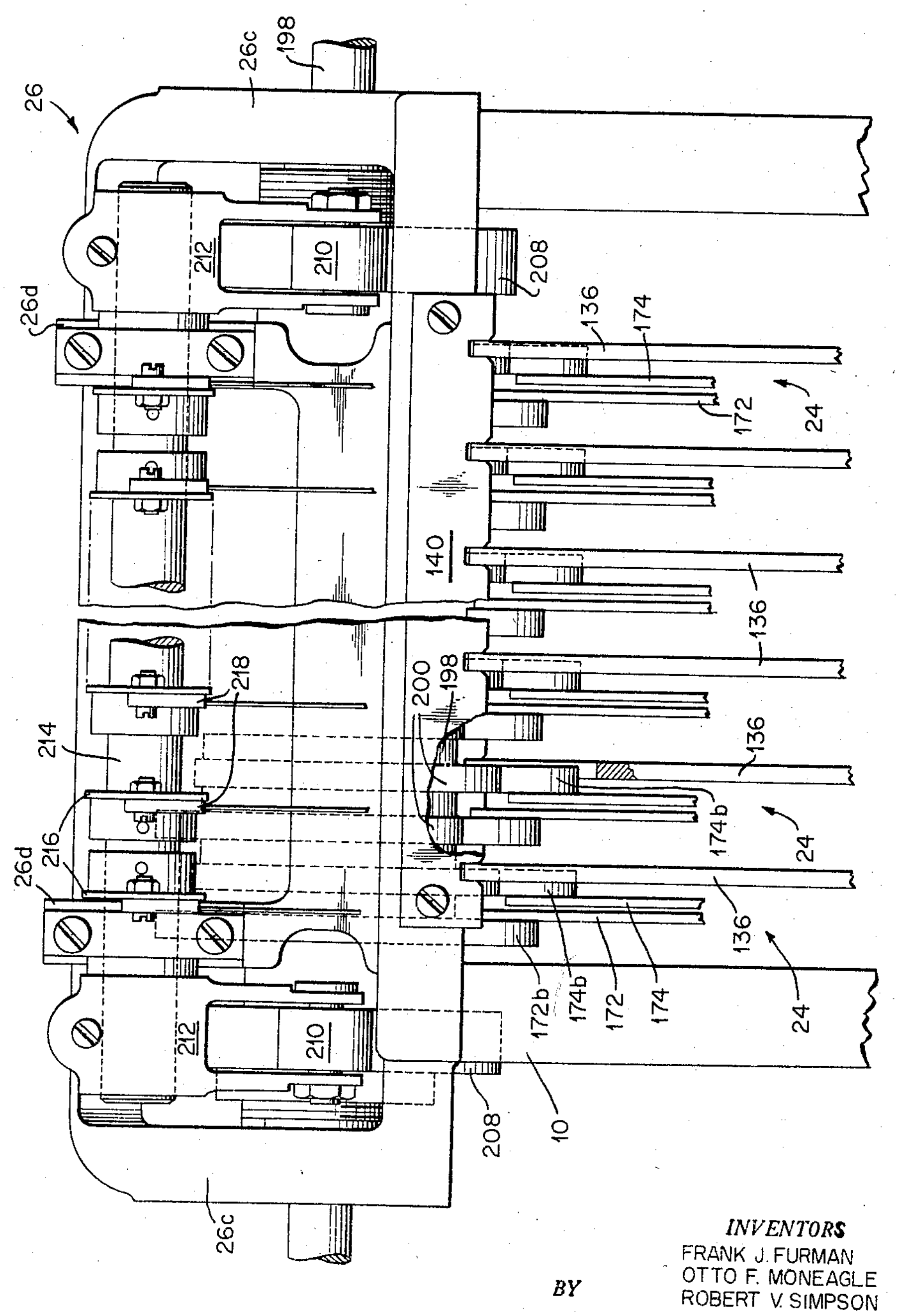
Fig. 5 is a front view of a portion of the printer shown in Fig. 1*b*.

Each print plate assembly (Figs. 1*a*, 2, and 3) comprises two print mechanisms. On each side of a print plate are mounted the guide tubes 54 for the print wires 56 of a print mechanism. The lower ends of these guide tubes are fixed, as by soldering, in horizontal slots formed in a vertically extending bar 58 fixed to the print plate. From there the guide tubes extend rearward and upward to where they converge into a cable 60 which is fixed to the print plate through clamp 62. The cables on the respective sides of the print plates extend upwardly and rearwardly from the upper ends thereof to where they are received in respective print heads 28 suitably spaced in the transverse carriage 30. The curve formed in the upper ends of these cables is such as to freely accommodate the print stroke of the respective print heads.

For the particular construction of a print head which may be employed in the printer, reference may be had to the copending application Serial No. 478,649 of Frank J. Furman and Robert V. Simpson, filed December 30, 1954. It suffices to point out here that the guide tubes 54 for a cable are fixed to the print head and that print wires 56 which are slidably accommodated in these tubes have a normal position in which their print ends are approximately flush with the rearward face of the print head. When such print wires are preset, those forming the component dots of a particular character pattern are displaced rearwardly from the face of the print head so that when the latter undergoes a print stroke, they will strike the ribbon 38 to impress the character pattern upon the paper 36.

The print wires extend forward from the horizontal fixed ends of the guide tubes 54, and thereat each is provided with an inertia slug 64. These inertia slugs are fixed to the respective print wires and slidably supported in a slotted vertical bar 66 fixed to the corresponding side of the print plate. A plate 68 is placed over the slotted bar so as to confine the inertia slugs to their respective slots.

It is a feature of this invention that the wire setting bail or code rod guide housing 70 is slidably supported by the same framework (plate 42) supporting the print wires 56, thus permitting preassembly and pretesting of the print mechanisms before they are placed in the printer. This wire setting bail extends on both sides of the print plate and is of such thickness as to carry the code rods 72 for both print mechanisms mounted thereon. It is slidably mounted on the print plate through a vertically extending slot or slots formed in its rearward edge and which are received upon forwardly extending bosses 74 formed on the print plate 42. Thus, the wire setting bail is prealigned with rows of print wires when the print plate assembly is installed in a printer, and there is little likelihood that this aligned relationship will be disturbed.

The wire setting bail 70 carries the code rods 72 in vertical tubes 76 seated on forwardly extending lugs 78. The exterior surfaces of these lugs are grooved so that they receive the corresponding code rod guide tubes for more than half their diameter, and the tubes are held in these vertically aligned grooves by fingers 80 forming the forward extensions of a plate 82. This plate serves to hold the print wires in horizontally extending grooves formed on the opposite exterior surfaces of the wire setting bail forwardly of the code rods. It can thus be seen that there is established a rigid relationship between the code rod and the print wires, insuring perfect alignment at all times.

This wire setting bail also serves as the print wire restoring bail. To this end, its rearward ends are formed with laterally turned flanges 84 which are received between the inertia slugs 64 fixed to the respective print wires. These inertia slugs are headed at each end so that when the wire setting bail restores after printing has occurred, the flanges will pick up the preset print wires through the heads on the forward ends of the inertial slugs to restore the wires to their normal positions. The heads formed on the other or rearward ends of the inertia slugs serve to prevent overthrow of the print wires by the wire setting bail by engaging the rearward edge of the slotted bars 66. Springs 86 anchored between lugs 88 formed on the print plates and ears 90 formed on the upper and lower ends of the wire setting bail serve to urge the bail forward to its normal position as determined by the wire setting bail operating assembly 92.

The code rods 72 extend out of the bottom and top ends of the code rod guide tubes 76. A spring 93 anchored between a laterally turned ear 94 on the upper edge of the print plate and a hook 96 attached on the upper end of the corresponding code rod serves to bias the code rod upwards at all times to a normal position. Each code rod, which may be of the hollow type disclosed in the copending application of Frank J. Furman and Harold J. Kistner, Serial No. 478,651, filed December 30, 1954, now U.S. Patent No. 2,785,628 and having seven positions in the angular direction and eight positions in the axial direction for a total of fifty-six character-determining positions, is attached at its lower end to a long flexible stem 98. The lower end of this stem has fixed to it an elongated gear 100 topped by a thrust washer 102 through which rotation and translation are imparted to the code rod to index it in any of its various character-determining positions.

Figure 4:
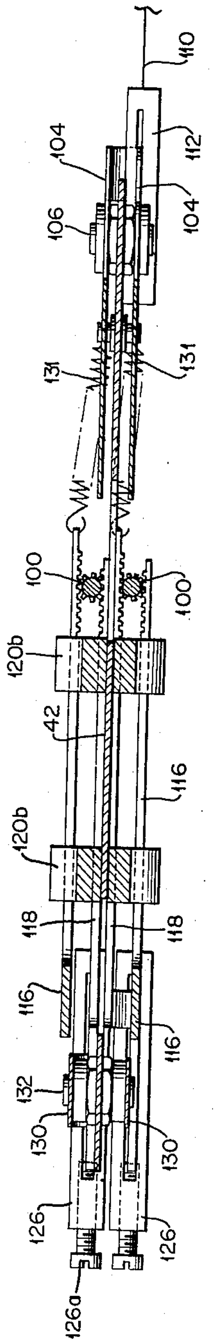
Fig. 4 is a view taken along the section line 4—4 of Fig. 1.

The lower end of each print plate 42 supports some of the linkage by which the code rods of the print mechanisms on the respective sides of it are adjusted. Referring more particularly to Figs. 1*a* and 4, the vertical indexing of each code rod is effected by moving it downward from its normal position by a corresponding compound lever 104. This lever, which is pivoted on a suitable stud 106 anchored to the print plate, projects rearwardly to where it carries a bifurcated extension 104*a*, which is received about the flexible stem 98 for the corresponding code rod and against which the washer 102 normally rests through the action of the tension spring 93 on the upper end of the code rod. The lever is urged to a raised position by a spring 108 anchored to it and to the print plate. This upward position is controlled, in the case of the left-hand one, that is, the one seen in Fig. 1, by a corresponding wire 110 formed at that end with a clip 112 readily attachable and detachable to a depending arm 104*b* fixed to the lever. An adjustable screw 112*a* on this clip facilitates minute adjustment of the lever 104 and hence of the code rod positioning. In the case of the lever 104 on the right-hand side of the print plate, its positioning is effected through an upstanding arm 104*c* fixed to it. The upper end of this arm is provided with an adjustable screw 104*d* through which the lever is positioned by a movable block 114. It can thus be seen that if a pull is exerted on the corresponding wire 110 or a push is exerted upon the screw 104*d* in the upwardly extending arm 104*c*, there will be effected a downward displacement of the corresponding code rod, the exact positioning of the code rod corresponding to the amount of displacement imparted to the wire or the movable block.

Rotation of each code rod to any of its seven positions is accomplished by a corresponding pair of racks 116 and 118 which cooperate with the gear 100 fixed to the flexible stem 98. The racks for the two code rods on each print plate are carried on the respective sides of the print plate in a member generally designated by the numeral 120. This member is slotted at its upper surface so as to be received on a depending portion formed on the corresponding print plate 42. In installing this member, it is slid upwardly on the portion until forwardly and rearwardly extending portions 120*a* are received on small lugs which depend from bosses 122 against which the forwardly and rearwardly extending portions finally come to rest. The member is then secured to the print plate by the tightening of screws 124. The lower end of the member 120 is formed with two spaced depending brackets 120*b*, and these brackets are suitably formed with horizontally aligned slots to receive slidably the racks 116 and 118 for each of the code rods.

At their rearward ends the racks 116 and 118 for the respective code rods respectively extend upwardly and downwardly. The rack 118 having the downwardly extending portion is received in a readily attachable and detachable clip 126 anchored at one end of a corresponding wire 128. Also received in a slot formed in this clip is the lower end of a lever 130 pivoted at an intermediate point upon a stud 132 fixed to the print plate. The upper end of this lever is pivotally connected to the end of the rack 116 having the upwardly directed portion. A spring 131 (Figs. 1*a* and 4) attached to the other end of rack 118 urges it forward to the home position and being mounted on an angle reduces the backlash between the rack and pinion. It can thus be seen that a pull on the wire 128 will move the rack 118 forward while imparting a corresponding rearward movement to the rack 116. A spring 134 anchored at one end to the upper end of the lever 130 and at its other end to the print plate biases the lever 130 so as to maintain the wire 128 taut at all times, thus permitting the latter to accurately determine the corresponding code rod position in the angular direction. A screw 126*a* is also provided on the clip 126 to facilitate minute adjustment of the angular position of the code rod with respect to the wire 128.

*Set-up plate assemblies*

The mechanisms for positioning the code rods for the respective print mechanisms on the opposite sides of a print plate 42 are mounted on a corresponding set-up plate 136. Thus, one set-up plate assembly 24 is provided for each print plate assembly 22, and it is a feature of this invention that they, too, may be preassembled and adjusted before insertion in a row across the machine. The set-up plate assemblies are located in the printer machine by means of the transverse bars 18 and 20, and by means of hooks 138 extending through suitable openings formed in the upper ends of the plates 136 and bolted to a cam housing 26*a* of the cam operating assembly 26 by which the print plate assemblies are cyclically operated. The set-up plate assemblies are located across the machine by means of downwardly opening combs 140 fixed to the front and rear surfaces of the cam housing 26*a*, a forwardly opening comb 142 fixed to the bottom of the transverse bar 18, and a rearwardly opening comb 144 fixed to the bottom of the transverse bar 20. The underside of the transverse bar 18 is formed with a groove in which are received upwardly extending lugs 136*a* formed on the rearward edges of the set-up plates 136. It can be seen that ready removal and insertion of the individual set-up plate assemblies may be accomplished without disturbing the other assemblies in the machine. It should also be recalled that this removal will be unencumbered by the connections that the wires 110 and 128 make with the code rod translating and rotating mechanisms, as these are connected therewith by the readily disconnectible clips 112 and 126.

Figure 1B:
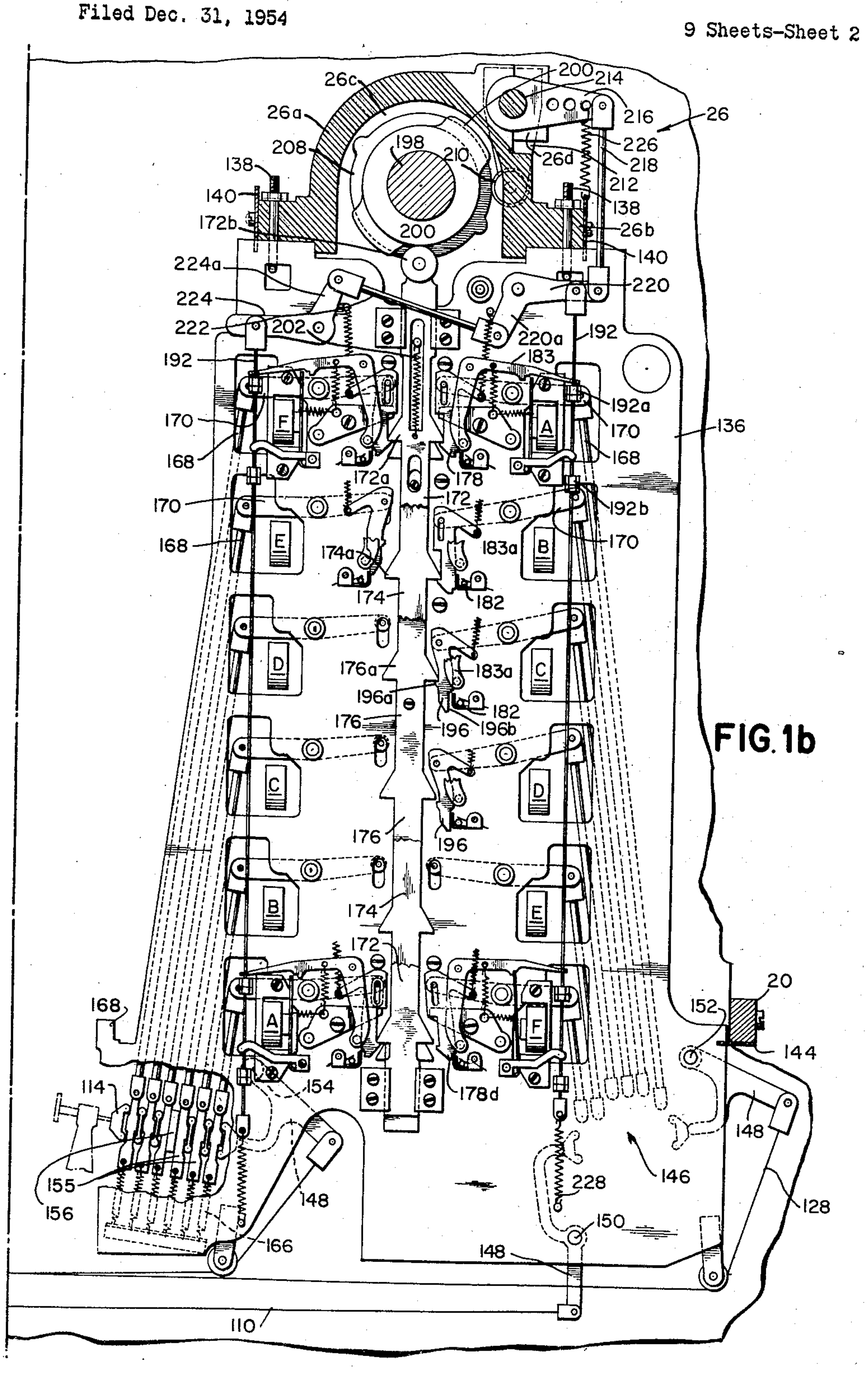

For operating the wires 110 and 128 and the blocks 114 operatively connected to the translating and rotating mechanisms for the code rods on the respective sides of the print plate, a set-up plate assembly is provided with two similar wedge banks 146 located on the right-hand side (rearward side as seen in Fig. 1*b*) of the set-up plates. The wedge bank for the print mechanism located on the left side of a corresponding print plate is mounted on the lower forward edge of the set-up plate, whereas the wedge bank for the print mechanism on the other or right side of the corresponding print plate is located on the lower rearward edge of the set-up plate. Each wedge bank consists of two units or sets of wedges, which operate to displace corresponding levers 148 to where they exert a pull on corresponding wires 110 and 128 to effect translation and rotation of the respective code rod. Thus, the translation of the code rod on the left side of the print plate is effected by the counterclockwise rotation (Fig. 1*b*) of a lever 148 pivoted on a plate stud 150 which exerts a pull on a wire 110, thereby overcoming the action of the springs 108 and 93. Rotation of this code rod is effected by the counterclockwise rotation of a lever 148 on a plate stud 152 which exerts a pull on the wire 128 against the action of the spring 134. Rotation of the code rod on the right-hand side of the print plate is effected, displacing a lever 148 pivoted on a set-up plate stud 154 to exert a pull on a wire 128. Translation of this code rod is effected by direct engagement of the wedge unit block 114 with the set screw 104*d* fixed to the upwardly extending arm 104*c* integral with the corresponding lever 104.

Figure 6:
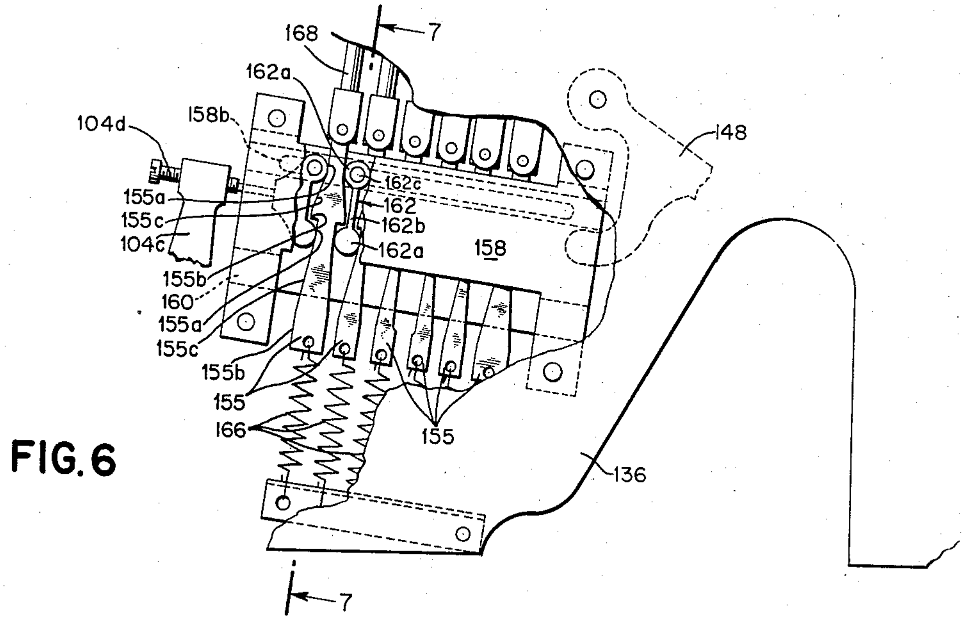
Fig. 6 is an enlarged view of a portion of the apparatus shown in Fig. 1*b*.
Figure 7:
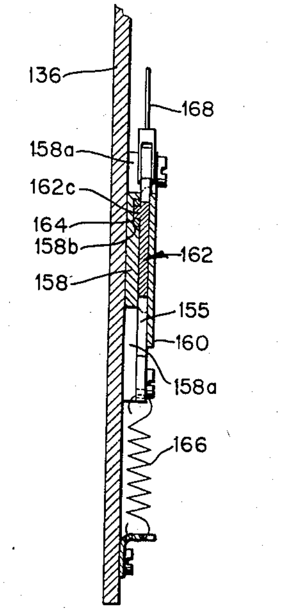
Fig. 7 is a view taken along the section line 7—7 of Fig. 6.

The wedge banks are identical in construction so that a description of one suffices. Referring more particularly to the wedge bank shown in the lower left of Figs. 1*b*, 6, and 7, it can be seen that a wedge bank is divided into two units of three wedges 155 each by a fixed block 156. Each wedge bank is a structure which comprises two plates 158 and 160 which are bolted together in spaced relation, through offset portions formed on the plate 158, so as to receive the wedges 155 and associated structures. Each wedge 155 is comprised of two dwell surfaces 155*a* and two high surfaces 155*b* interconnected by camming surfaces. They are separated from each other by "dumbbell" like elements 162 having cylindrical portions 162*a* which normally are in engagement with the dwell surfaces 155*a* on the wedges and rigidly interconnected by a strap 162*b*. The separator elements 162 are prevented from falling out of the wedge units by laterally extending studs 162*c* on the upper cylindrical portions which bear bushings 164 seated in a corresponding longitudinal groove 158*b* formed in the side plate 158 of the wedge bank. Preferably, the wedges are so arranged that the second and third wedges extending outwardly from the interior of a wedge unit bear the values "2" and "4," respectively, while the first one bears the value "1," so as to require only a minimum of displacement of all the wedges. The wedges are urged to their normal or down position by springs 166. Links 168 are pivotally connected at their lower ends to the upper ends of the wedges and at their upper ends to vertically spaced horizontal levers 170 pivoted along the back side of the set-up plate 136, the levers for the rearward wedge bank being located along the rearward edge of the set-up plate, while those for the forward wedge bank are located along the forward edge thereof. It can be seen that, when one or more of the levers for a bank of wedges is raised, an upward pull will be exerted on the corresponding link or links 168 to raise the corresponding wedge or wedges 155 against the action of the spring 166. This displaces the corresponding wedge or wedges to where the high surfaces 155*b* are disposed opposite the "dumbbell" cylindrical portions 162*a*, and since the wedges can move in an outward direction only, it will be seen that an outward displacement will be imparted to all of the wedges and/or separating elements exterior of it or them. This displacement, which may be the sum of several wedge displacements, is then imparted to a final displacement member which is the block 114 earlier referred to. The block 114 is a modified "dumbbell" element for the third wedge and also serves as an abutting surface for the levers 148 and the screw 104*d* mentioned earlier. This displacement is imparted by the wires 110 and 128 and the screw bearing lever arm 104*c* to adjust the corresponding code rod. When the horizontal levers 170 are lowered, it can be seen that the wedges will restore under the action of the springs 166, and the wedge units will compress or restore towards their original conditions under the action of the print mechanism springs 93 and 108 and 134.

Positioning of these wedges is effected by energizing corresponding plate-mounted magnets A, B, C, D, E, and F cooperating with a common drive mechanism for the forward and rearward wedge banks. Since there are six wedges in each wedge bank, three being used for translating the code rod to each of seven positions from a home position and three being used for rotating the code rod to each of six positions from a home position, magnets A, B, and C may be designated as those controlling rotation, and magnets D, E, and F as those controlling translation. The pulsing of any one or more of these magnets will result in the disposition of a corresponding code rod in a character-determining position.

As observed earlier, the set-up mechanisms for the code rods embody the non-return-to-zero principle. That is, the mechanism acts to move the code rod directly from one position to another without movement through the zero or home position. This is accomplished through the use of a drive mechanism, such as is disclosed in the Beattie Patent No. 2,661,683, issued December 8, 1953. In the instant embodiment of such a drive mechanism (Figs. 1*b*, 5, 8, 9, and 10), two reversely reciprocable lug-bearing bars 172 and 174 are slidably mounted between the magnets for the respective wedge banks. A third underlying bar 176 is provided which is fixed to the set-up plate. It is provided with lugs 176a which underlie the position of the lugs on the slide bars when they are in their restored or home positions. Thus, it will be appreciated that each of these bars is provided with six lugs on each of its forward and rearward edges, and these are located along the bars so as to be adjacent the corresponding magnets.

The operation of the levers 170, which are attached to the wedge-shifting links 168, is effected by the swinging of pawls 178 into the path of the lugs 172a and 174a on the corresponding slide bars. This obtains because each lever is provided with a laterally extending stud 170a which projects through an opening in the set-up plate to where the pawls 178 may be pivotally mounted thereon opposite the respective bars. The pawls 178 are provided with teeth 178a which, when the pawls are swung inwardly toward the corresponding slide bars against the action of tension springs 180 anchored to the corresponding pawl lugs 178b, are disposed in the path of corresponding lugs on the slide bars. Since one slide bar will be moving down while the other slide bar is moving up, it can be seen that at least one of two lever pawls will be acted upon to move in the downward direction and impart a rotation to the corresponding yever 170 which effects a raising of the corresponding wedge link 168. The other pawl will be engaged by the lug on the slide bar restoring, but the engaging surfaces are so shaped that this pawl is merely cammed outwards out of the path of the upcoming lug. That this may result in the shifting of the instrumentality which moved the pawls into the slide bar paths has no adverse effect as, by this time, the pawl which was pulled downward is now disposed behind a spring biased keeper 182 which prevents the outward movement of that pawl. The other pawl would not be down because the action of the tension spring 180 through the pawl lug would have held it upward—relative movement of the lever and this pawl is accomplished through the lost-motion slot 178c in the upper end of the pawl.

Figure 8:
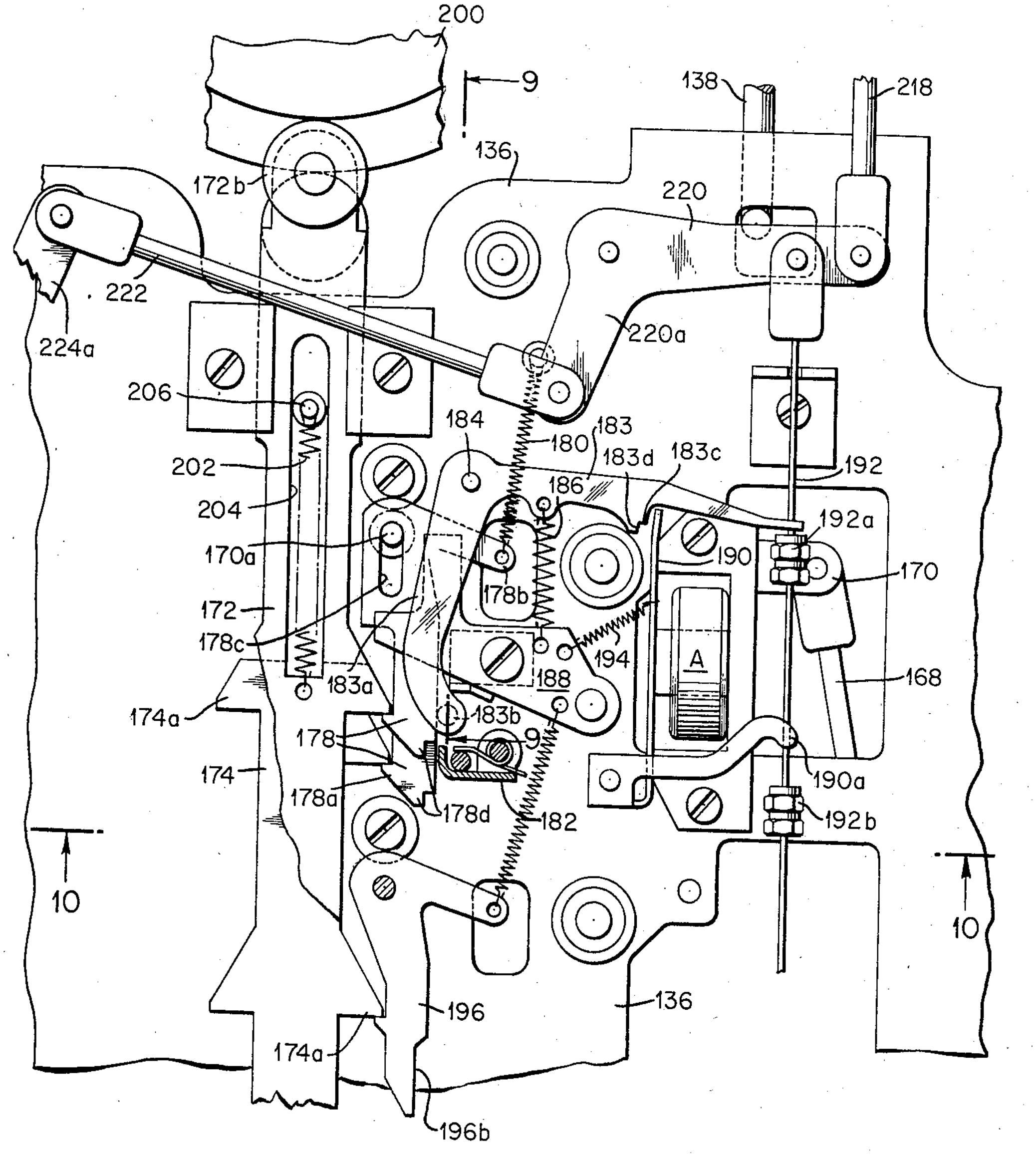
Fig. 8 is an enlarged view of a portion of the wire printer shown in Fig. 1*b*.
Figure 9:
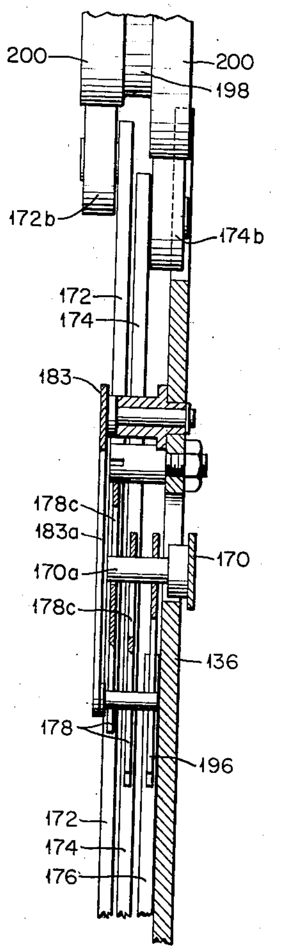
Fig. 9 is a view taken along the section line 9—9 of Fig. 8.
Figure 10:
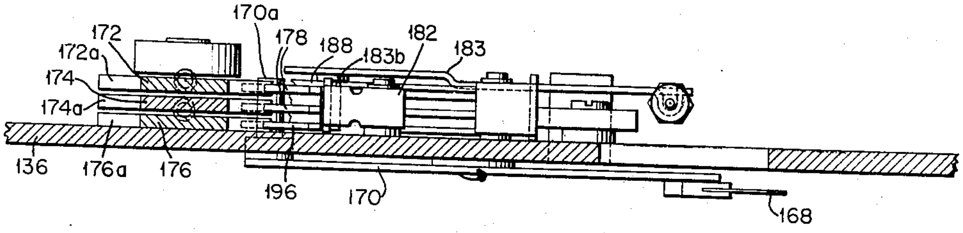
Fig. 10 is a view taken along the section line 10—10 of Fig. 8.

The instrumentality by which the pawls are moved into the paths of the corresponding slide bars is a latch arm 183. This latch arm is pivoted to the set-up plate on a stud 184 and biased to move a depending arm 183a having a stud 183b in the direction of the pawls 178 by a spring 186 which is anchored at its other end to a plate 188 mounted in spaced relationship to the set-up plate 136 which projects to where it serves as an outer boundary guide for the corresponding set of pawls 178 to insure that their proximate relationship will be always maintained. The latch arm 183 is released for biased movement by the spring 186 when the corresponding magnet A, B, C, D, E, or F is pulsed. For example, when the magnet A for the forward wedge bank is pulsed, it acts to attract a pivoted armature 190 to where its upper or free end is withdrawn from beneath a seat 183c on the latch arm 183, thus allowing the latch arm to pivot clockwise as seen in Figs. 1*b* and 8. This results in the pawl action aforedescribed with the result that the corresponding wedge will be raised to effect a counterclockwise displacement of the lever 148 on stud 152 in the amount of four units of spacing. This, of course, is transmitted through the corresponding wire 128 to the code rod rotating mechanism so that the code rod will be indexed at least four positions in the angular direction. Of course, either of the magnets B or C might have also been pulsed to effect an indexing of the code rod to the fifth or sixth position from the home position. It may also be observed by referring to the timing chart of Fig. 11 that the slide bars have a dwell position. Thus, a slide bar remains in the advanced position for a period of time which is sufficient to maintain the code rod in its adjusted condition while it is moved against the print wires 56 to impart a differential set-up thereto.

After a while when the advanced slide bar, bar 174 in the drawings, does restore, the corresponding pawl follows it upwardly, and if the latch arm 183 is restored, the pawl swings outwardly as it withdraws from behind the keeper 182 to where a recessed tip 178d on the end thereof strikes the keeper (see, for example, the pawl 178 for the right-hand magnet F in Fig. 1*b*). Preceding the restoration of the slide bar, a reset and knock-off wire 192 for each of the sets of magnets would have been raised. This wire is provided with a collar 192a for each of the latch arms 183 and is effective to raise the latch arm to where the armature 190 biased by a spring 194 may slip underneath the seat 183c until it strikes a stop 183d thereon. In order to make sure that the armature moves underneath the latch arm seat, that is, that it isn't held by the residual magnetism in the core of the magnet, a second collar 192b is mounted on the reset and knock-off wire 192 so as to strike an arm 190a of the pivoted armature a moment after the latch arm seat is raised beyond the end of the armature. This action all takes place before the time for energizing the magnet occurs in the cycle.

It may occur, and often does, that the same magnet is energized in successive cycles. The pulse time for the magnets is such that it occurs before the slide bar, which was moved to the advanced position for the preceding cycle, restores. Thus, when a magnet is energized again in the following cycle, for example, magnets B and C for the forward bank of wedges in Fig. 1*b*, the pawls for the advanced slide bar would still be in the engaged position. However, at this time a pawl 196 (also pivoted on lever stud 170a) for the corresponding lug 176a on the fixed bar 176 will now be in a position in which the tooth 196a thereon is below the corresponding lug 176a so that the re-energization of the magnet is effective through the latch arm 183 to move the pawl tooth 196a underneath the lug. While the magnet is almost immediately deenergized, the continuing unlatched condition of the latch arm renders the same effective to hold this pawl in engagement with the fixed bar while the slide bar which had advanced the lever 170 and the engaged pawl 178 and the pawl 196 recedes. In due course, however, the now advancing slide bar 172 travels with the now engaged other pawl 178 to where it takes over the control of the lever 170. It will be recalled that the pawls 178 are held in engagement with the slide bar lugs when advanced slightly by the keepers 182 so that when the reset wire 192 is effective to restore the latch arm 183, the lever 170 does not restore. The non-slotted pawl 196 is free, however, at this time to swing outward beyond the lug 176a on the fixed bar 176 because it is cut away as at 196b. This position is that demonstrated for the pawl 196 corresponding to the right-hand magnet D.

*Set-up assemblies cam operating assembly*

The cam housing 26a of the set-up assembly cam operating assembly 26, in addition to serving as the upper support for each of the set-up plate assemblies 24, contains the means which operates their mechanisms, namely, the slide bars 172 and 174 and the reset and knock-off wires 192. The housing 26a is a semicircular casting extending transversely of the printer over the set-up plate assemblies 24 and is provided on its lower, forward, and readward edges with flanges 26b on which the hooks 138 supporting the assemblies 24 are mounted. At their ends the flanges are suitably apertured to permit bolts to be inserted therethrough for threaded engagement with the side plates 10 of the printer to secure the housing thereto. The ends of the housing are closed by side plates 26c (Figs. 1*b* and 5), and in these side plates is mounted a continuously rotatable shaft 198 synchronized with the operation of the printer and rotatable one-half revolution in each cycle. Two identical single lobed cams 200, 180° out of phase with each other, are mounted upon this shaft at each set-up plate assembly position so as to cooperate with rollers 172b and 174b fixed to the upper ends of the respective side bars 172 and 174 of the corresponding set-up plate assemblies. These rollers and their slides are made to follow the cams 200 by means of springs 202 (Figs. 1b and 8) situated in slots 204 cut in the side bars and anchored at their lower ends to the respective slide bars and at their upper ends to laterally projecting studs 206 fixed to the respective set-up plate. The cams operate the respective slide bars according to the timing indicated by the chart of Fig. 11.

To operate the reset and knock-off wires 192, a cam 208 is mounted at each end of the shaft 198. These are double lobed cams which cooperate with rollers 210 mounted on the lower end of arms 212 fixed to a shaft 214 rotatably in brackets 26d projecting upwardly and forwardly from the housing 26a. This shaft extends across the housing and thus over all of the set-up plate assemblies 24 and at each set-up plate assembly position is provided with a horizontally and forwardly extending arm 216. The end of each of these arms is pivotally connected to a vertical link 218, the lower end of which is pivotally connected to the forwardly extending free end of a lever 220 (Figs. 1b and 8) pivoted to the respective set-up plate. This lever overlies the reset and knock-off wire 192 situated at the forward edge of the set-up plate and is pivotally connected thereto.

The operation of the reset and knock-off wire 192 at the rear edge of the set-up plate is effected through an arm 220a fixed to the lever 220. This arm is pivotally connected to one end of the link 222, the other end of which is connected to an upperly extending arm 224a fixed to a horizontally and rearwardly extending lever 224 pivoted to the set-up plate and overlying the other or rear reset and knock-off wire 192. Since the arm 220a attached to the lever 220 extends downwardly, whereas the arm 224a attached to the lever 224 extends upwardly, it can be seen that a reset and knock-off wire 192 pivotally connected to the lever 224 will be raised and lowered when the forward wire is raised and lowered. The rollers 210 are made to follow the cams by springs 226 anchored to each of the arms 216 and to the comb 140 affixed to the forward flange of the housing 26a. In addition to this bias, there is also another force tending to do the same thing, and this arises through the action of springs 228 attached to the lower end of the respective reset and knock-off wires 192. Hence, the wires are normally urged to their home position, and the action of the cams is such as to raise the wires at the times indicated by the chart of Fig. 11.

*Wire-setting bail operating assembly*

After the code rods 72 have been positioned by the operation of one or the other of the slide bars 172 and 174 of the corresponding set-up plate assemblies 24, the wire setting bail 70 is moved in the axial direction of the print wires 56 (Figs. 1a, 2, and 3) to move the code rods thereagainst and effect selective axial displacement of them with respect to each other. This is effected by the wire-setting bail operating assembly 92 (Figs. 1a and 2) which comprises a housing 92a generally rectangular in cross-section and extending across the printer so as to be disposed forwardly of the print plate assemblies 22. It is supported in the printer in spaced relationship to the side plates thereof by bosses 330 (Fig. 2) formed thereon and threadedly receiving bolts (not shown) extending through the printer side plates 10. The casting is formed with end plates 92b which in their forward portions centrally mount a continuously rotatable shaft 332 synchronized with the operation of the printer and so as to complete one-half revolution in each cycle, that is, one revolution in every two cycles. The shaft extends beyond the end walls of the housing and is there provided with double lobed cams 334.

Figure 11:
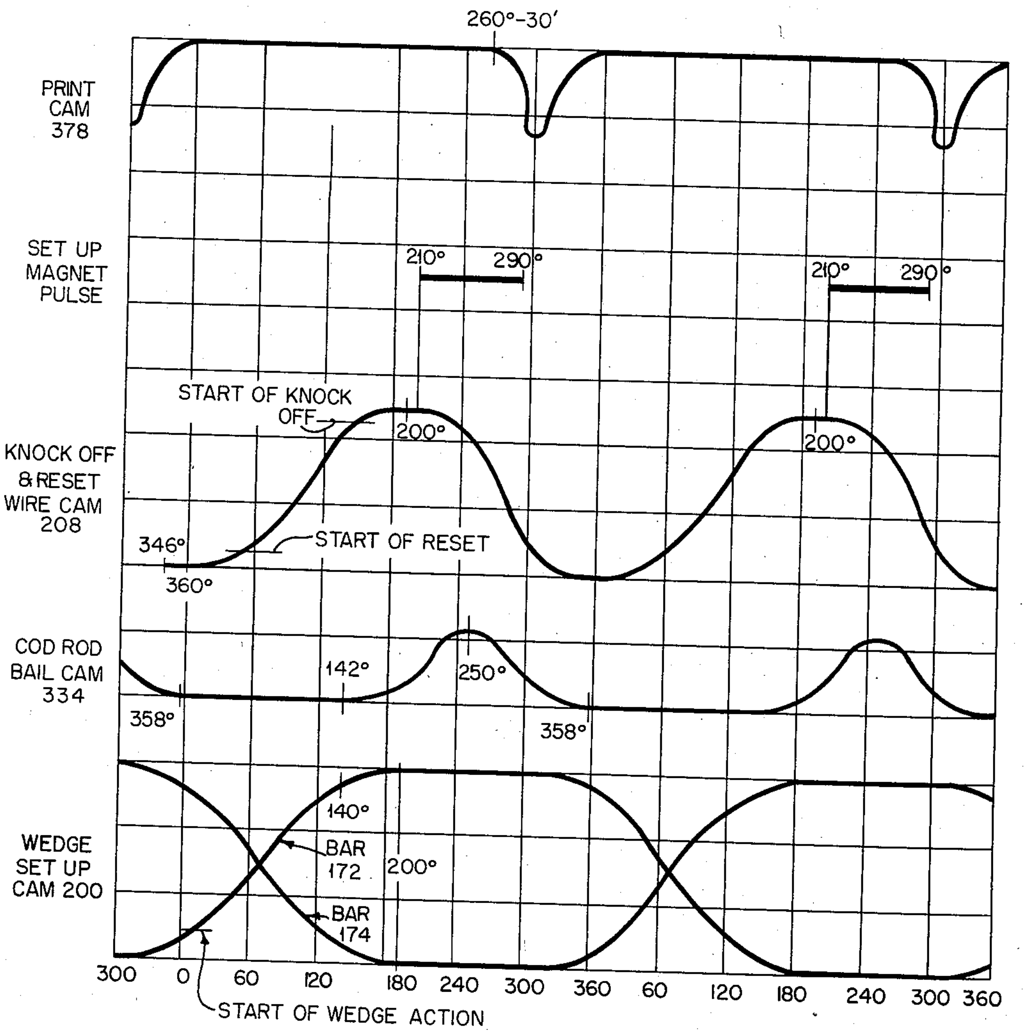
Fig. 11 is a chart depicting the timing of various printer components.

Cams 334 are effective to operate the wire setting bails at the times indicated by the chart of Fig. 11. The cams operate upon rollers 336 and 338 located above and below them on the ends of arms 340 and 342 fixed at their rearward ends to two vertically spaced, horizontally extending shafts 344 and 346 journalled in the end walls 26c of the housing. These shafts are made to follow the cams 334 by means of springs 348 and 350 anchored at one end to studs 352 extending laterally from the end walls of the housing and at their other end to upwardly and downwardly extending arms 340a and 342a on the levers 340 and 342. To operate each of the wire setting bails 70, these shafts are provided at each print plate position with upwardly and downwardly extending arms 354 and 356 bearing at their free ends adjustable set screws 358.

In addition to these elements, the wire-setting bail operating assembly also includes a pair of transversely-extending vertically-spaced bars 360 and 362 fixed to the end walls 26c of the housing. These bars are disposed opposite the free ends of the arms 354 and 356 on the shafts 344 and 346 and are apertured at each print plate position so as to accommodate headed slide bars 364. These slide bars cooperate with corresponding lugs 366 (Figs. 1a and 3) formed on the forward edges of the respective wire setting bails. Engagement between the slide bars 364 and the arms 354 and 356 and between the bails 70 and the slide bars is at all times maintained by the springs 86 fixed to the upper and lower ends of the respective wire setting bails. It will be evident that the cams 334 at all times determine the position of the wire setting bails 70. It will be further evident that the attitude of a wire setting bail with respect to its corresponding print wires 56 may be varied by adjusting either or both of the set screws 358 on the free ends of the arms 354 and 356, thereby enabling adjustment to be made insuring that equal displacements will be imparted to the print wires at each end of the corresponding code rod. It should also be noted that there is nothing critical between the location of the print plate assemblies 22 and the wire-setting bail operating mechanism 92, as all that is necessary to insure proper operation is contact between the slide bars 364 and the lugs 366 on the wire setting bails. Hence, insertion and removal of the individual print plate assemblies is readily accommodated.

*Print head operating mechanism*

The print heads 28a are made to undergo an impact stroke through the action of spring-fired actuating arms 368. These arms are rotatably mounted on a transversely extending rod 370 mounted on forwardly and downwardly extending brackets 372a carried by a housing 372. This housing, which is fixed at its ends to the side plates 10 of the printer, is generally U-shaped in cross-section. The forward leg of this U-shaped structure is periodically apertured along its transversely extending length, and through these apertures are mounted springs 374 by which the actuating arms are operated. One end of each spring is attached to the corresponding actuating arm through a suitable aperture therein while the other end is attached to a slotted comb 376 fixed to the rearward surface of the rearward leg of the U-shaped member. The springs thus at all times urge the corresponding actuating arms rearwardly and cause them to follow the contour of a transversely extending cam 378.

This cam is rotatably mounted in the side plates 10 of the printer. It is driven so as to complete one revolution in each printer cycle and is formed with a carefully calculated low point 378a to provide controlled movement on the part of the actuating arms when it is moved beneath rollers 380 fixed to lugs 368a formed on the arms.

The movements of the actuating arms 368 are imparted to the print heads 28 through tube and wire arrangements. The tubes 382 are fixed at their forward ends to the top of the forward leg of the U-shaped housing 372 and at their rearward ends to the forward ends of brackets 32a fixed to the frame member. A drive wire 384, slidably mounted in each tube, is pivotally attached at its forward end to the corresponding actuating arm and at its rearward end to the corresponding print head. Thus, when the low point on the cam 378 comes opposite the rollers 380, the rollers descend thereinto under the bias of the springs 374 to move the arms counterclockwise and force the drive wire rearward through the tubes. This action drives the print heads rearward, and if any of the print wires 56 for the different print mechanisms were preset, characters will be impressed on the paper 36 through the inking ribbon 38. The depression 378*a* in the cam is of such short duration as to cause the actuating arm to be almost immediately restored, thereby withdrawing the print head out of engagement with the recording material.

*Vernier printing-line adjustment mechanism*

Adjustment of the line of printing impact with respect to a form on the platen 34 is accomplished through a mechanism such as that shown in Fig. 1a. In this mechanism the transversely extending frame member 30 is attached at its respective ends to plates 386 vertically guided upon the side plates 10 of the printer. These plates 386 are each horizontally cut away as at 386*a* to slidably receive a block 388. These blocks are each formed with a circular opening into which is fitted a disk 390 eccentrically fixed on a shaft 392. This shaft is rotatably mounted in the printer side plates 10 and suitably detented so as to permit its minute rotational adjustment. It can be seen that, by rotating the shaft, the relationships of the eccentric disks 390 to that of the slidable blocks 388 may be varied to raise and lower the latter. This vertical adjustment of the blocks 388 in turn is imparted to the vertically guided plates 386 with the result that the line of printing impact for the print heads 28 may be raised and lowered as desired. It can thus be seen that there is provided a simple way for adjusting the height of the print line which in no way introduces any mass to the moving parts of the machine, thus enabling high printing speeds to entail.

*Operation*

The operation of this printer may be more fully described with reference to the timing chart of Fig. 11. As is shown on this chart, the impulse to the set-up magnets A, B, C, D, E, and F is delivered between 210° and 290° cycle time to release the latch arms 183. Thereafter, at about 320° cycle time, the cams 200 for one of the slide bars 172 or 174 of each set-up plate assembly begins to depress those slide bars to position the wedges 155 on the basis of the pawls 178 which were moved into the slide bar path by the released latch arms 183. The wedge action is completed by 140° cycle time, though the slide bars continue movement to 200° cycle time. Through the interconnections between the wedges 155 and the code rods 72, the latter will simultaneously be indexed to differential positions indicative of particular characters. The code rod housing bails 70 may now be adjusted to move the code rods against the corresponding print wires to impart differential settings thereto. Thus, at 142° cycle time the code rod bail cam 334 becomes effective, and by 250° cycle time has moved the code rods fully against the print wires. The code rod bail cam almost immediately begins to recede so as to allow the print wires to move rearwardly during printing time without striking the code rod bails. This printing time is effectuated by the cam 378, beginning at 260° 30′ and reaching full effectiveness at 300° cycle time. During this time, the code rod bail cam has continued its restoring movement so that the restoring flanges 84 on the respective bails 70 pick up the inertia slugs 64 to restore the preset print wires to their normal condition by 358° cycle time.

In the meantime, the knock-off and reset wire cam 208 has been operative to restore the latch arms 183. This cam begins its effectiveness at 346° of cycle time to cause the wires to reach a maximum raised position by 200°, which is before the time for the pulses to the set-up magnets. The cam holds the wires 192 in this raised position for a portion of the pulse time; however, before the pulse time has proceeded very far, it lowers the wires 192 to where the collars 192*b* thereon permit the armatures 190 to pivot under the influence of the corresponding magnet. It can be seen that, while the code rod bail cam 334 is effective to transfer the information from the indexed code rods to the print wires 56, the set-up magnets are being conditioned with the information to be printed in the next cycle and that as soon as the code rod bails have restored, the code rods are indexed to new positions.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a print plate assembly, a mounting plate, a plurality of print wires mounted on one side of said plate so that their control ends are parallel, a movable housing including adjustable code means carried by said plate, said wires projecting into said housing and engageable by said code means when the housing is moved on said plate for movement from initial to advanced positions, collars fixed to the respective print wires, and means associated with said housing to engage the collars and restore the wires to the initial position when the housing returns to its normal position.

2. In a print plate assembly, a mounting plate, a plurality of print wires carried by said plate and so that the control ends thereof are parallel, a set-up means carried by said mounting plate and movable from a normal position against said wires to effect selective longitudinal displacement thereof, collars fixed to the respective wires, and other means movable with said set-up means to engage said collars to restore the displaced wires as the set-up means restores to its normal position.

3. In a print plate assembly, a mounting plate, a plurality of print wires carried on each side of said mounting plate and so that the control ends thereof are parallel, a housing carried by said mounting plate and movable thereon, and character determining elements carried by said housing for the wires on the respective sides of said plate, said elements being effective when the housing is moved on said plate to engage the control ends of the wires to and effect their selective longitudinal displacement.

4. In a print plate assembly, a mounting plate, a plurality of print wires carried on each side of said plate and so that their respective control ends lie in common planes, a tongue on said plate, a housing slotted so as to be slidably received on the plate tongue and movable thereon, and code rods carried by said housing for the wires on the respective sides of the plate, said code rods being effective when the housing is moved on said plate to engage the control ends of said print wires and effect their selective longitudinal displacement.

5. In a print plate assembly, a mounting plate, a plurality of print wires carried on a side of said mounting plate, set-up means carried by said plate for movement against said wires to effect their selective longitudinal displacement, a pair of simultaneously operable elements for engaging the respective ends of said set-up means to move the same against the print wires, and means for biasing said set-up means into engagement with said elements.

6. In a print plate assembly, a mounting plate, a plurality of print wires carried on a side of said mounting plate, set-up means carried by said plate for movement against said wires to effect their selective longitudinal displacement, a pair of spaced elements for engaging the respective ends of the set-up means, common means for effecting simultaneous operation of said spaced elements, adjustable means for effecting the relationship of said spaced elements with respect to the common means and each other, and means for holding said set-up means in engagement with the pair of spaced elements.

7. In a print plate assembly, a mounting plate, a plurality of print wires having control ends carried by said plate so that the control ends lie in a common plane, a rockable housing movably carried by said plate, a code rod carried by said housing so as to engage the control ends of the print wires when the housing is moved from a normal position on said plate, a pair of spaced movable elements disposed opposite the respective ends of said housing, means for holding said housing in engagement with said elements, common means for moving said elements to move said housing to the normal position, and adjustable means between at least one of said elements and said common means for affecting the relationship of said element with respect to said common means and the other element for varying the attitude of the housing-carried code rod to said print wire control ends.

8. In a set-up plate assembly, a mounting plate, a plurality of magnets mounted along each of the leading and trailing edges thereof, corresponding elements for each of the magnets biased to a normal position, a pair of reversely reciprocable slides mounted on said plate, and means for connecting an element to one of said slides when the corresponding magnet is energized.

9. In a set-up plate assembly, a mounting plate, a plurality of magnets mounted along each of opposite edges thereof, corresponding slides for each of said magnets biased to a normal position, a bar fixed to said plate, a corresponding set of bars slidably mounted on said plate and reversely reciprocable from normal positions, corresponding elements for each of said magnets and having normal positions, means for operatively connecting an element to the bar being reciprocated from home position when the corresponding magnet is energized, and means for latching said previously mentioned means to said fixed bar if the magnet is energized in the following cycle to prevent the return of the corresponding element to the normal position before it is engaged by the slide then moving from the normal position.

10. In a set-up plate assembly, a mounting plate, a plurality of magnets mounted along each of oppositely disposed edges thereof, corresponding wedges for each of the magnets respectively operative when displaced to effect a different output, means biasing said wedges to the normal position, a pair of slide bars mounted on said plate intermediate the pluralities of magnets, and means for operatively connecting the wedges to one or the other of the reciprocating slide bars when the corresponding magnets are energized so that the motion of the slide bar is imparted to the wedges.

11. In a set-up plate assembly, a mounting plate, a plurality of magnets mounted along each of the leading and trailing edges thereof, a corresponding wedge for each of said magnets organized into units for the corresponding plurality of magnets, a fixed bar mounted on said mounting plate, a pair of corresponding slide bars mounted on said plate and reversely reciprocable from normal positions, means operative to connect the corresponding wedge to the slide bar moving from the normal position when the corresponding magnet is energized, and means for connecting the corresponding wedge to the fixed bar when the same magnet is pulsed in the following cycle to prevent return of said wedge towards the home position while the one slide bar restores to normal position and the other moves therefrom.

12. In a cyclically set-up plate assembly, a mounting plate, a plurality of magnets mounted along each of the leading and trailing edges thereof, a corresponding element for each of said magnets biased to a normal position, a toothed bar fixed to said mounting plate intermediate said pluralities of magnets, a pair of correspondingly toothed bars slidably mounted on said plate adjacent said fixed bar and reversely reciprocable from home positions, levers connected at their one ends to the respective elements, pawls mounted on the other ends of said levers so as to dispose two of said pawls for cooperation with the slide bars and a third pawl for cooperation with said fixed bar, a latch arm for each of said magnets adapted to be released for biased movement when the corresponding magnet is energized, each of said latch arms including means effective to move the corresponding set of pawls into the path of the bars, a slide bar moving from the normal position being effective to engage such pawl to pivot said lever to move the biased element from the normal position, said latch arm also including means effective to cause the pawl cooperating with the fixed slide to engage a corresponding tooth thereon if the latch arm is again released for the following cycle through energization of the magnet to prevent the return of said lever and said element towards the normal position when the first slide restores to home position.

13. In a printer; a print plate assembly comprising a mounting plate, a plurality of print wires mounted on a side of said plate, and set-up means mounted on said plate and movable so as to coact with said wires and effect selective longitudinal displacement thereof; a set-up plate assembly comprising a mounting plate, a plurality of magnets mounted on this plate, a part displaceable different amounts from a normal position, elements for the corresponding magnets mounted on this plate and operative when displaced to effect displacement of the part, means for rendering the energization of a magnet operative to effect displacement of the corresponding element; and means for operatively connecting said part with said set-up means on said print plate whereby the energization of the magnets is enabled to control the type of character that will be printed.

14. In a printer, a plurality of readily insertable and removable print plates each bearing a print mechanism settable as to the type of character to be printed, a corresponding set of readily insertable and removable set-up plates each bearing a set-up mechanism for converting electrical signals into analog values of mechanical displacements, and means for connecting the mechanism of each set-up plate with the print mechanism of the corresponding print plate to enable the setting thereof to different characters.

15. In a printer, a print plate assembly having a print mechanism mounted on each side thereof, a corresponding set-up plate assembly having mechanisms for converting each of two different sets of electrical signals into analog values of mechanical displacement, and means for connecting the respective mechanisms on each set-up plate assembly with the respective print mechanisms of the corresponding print plate assembly to enable character selection.

16. In a printer; a print plate assembly comprising a mounting plate, a print mechanism mounted on said mounting plate and including a differentially positionable character determining element; a set-up plate assembly including a mounting plate, a mechanism for converting sets of electrical impulses into corresponding analog values in terms of mechanical displacement; and a readily attachable and detachable element for connecting said set-up plate mechanism with said differentially positionable character determining element of the print mechanism to impart said analog value to said element.

17. In a printer; a print plate assembly comprising a mounting plate, a print mechanism including a differentially rotatable and translatable character determining element mounted on said plate and members for respectively imparting rotation and translation to said element; a set-up plate assembly including a mounting plate, a pair of differentially displaceable parts, a mechanism for converting sub-sets of electrical impulses into analog values of mechanical displacement of the parts, cables attached at one end to the respective displaceable parts; and readily attachable and detachable clips attached to the other ends of said cables for connection to the rotation and translation imparting members on the print plate assembly.

18. In a printer; a print plate assembly comprising a mounting plate, a print mechanism including a differentially rotatable and translatable character determining element mounted on said plate and members for respectively imparting rotation and translation to said element; a set-up plate assembly including a mounting plate, a pair of differentially displaceable parts, a wedge unit consisting of several wedges for each of said parts, means biasing said wedges to a normal position, magnets for the corresponding wedges mounted on said mounting plate, a pair of elements reversely reciprocable from a normal position, means operative to connect a wedge to the element undergoing movement from the normal position when the corresponding magnet is energized, cables attached at one end to the displaceable parts; and readily attachable and detachable clips attached to the other ends of said cables for connection to the rotation and translation imparting members of the print plate assembly.

19. In a printer, a plurality of readily insertable and removable set-up plate assemblies each having operating elements and restoring devices, a housing mounted transversely of said assemblies and containing cam means for moving the operating elements in each of said assemblies, a common element mounted on said housing for operating the respective restoring devices, and additional cam means mounted on said housing to operate said common element.

20. In a printer, a print plate assembly including a plurality of print wires engageable by a differentially positionable character determining element, a set-up plate assembly for converting sets of electrical impulses into analog values of mechanical displacement of a part, means for transmitting the mechanical displacement of said part to said element to position the same, and a cam assembly including a pair of spaced elements concomintantly movable so as to cause the character determining element to engage the print wires.

21. In a printer; a plurality of readily insertable and removable print plate assemblies each including a plurality of print wires engageable by a differentially positionable character determining element; a corresponding number of set-up plate assemblies each including a part differentially displaceable in response to selective energization of a corresponding set of magnets by a pair of reversely reciprocable bars; a first cam means disposed transversely of said set-up plate assemblies and including a cam operative to alternately reciprocate the respective bars of each set-up plate assembly; means connecting said part on each set-up plate assembly with the element on the corresponding print plate assembly to transmit the differential positioning of that part to the corresponding element; and second cam means including pairs of vertically spaced elements for each of the print plate assemblies displaceable so as to engage the corresponding element with corresponding print wires.

22. In a printer, a code rod rotatable and translatable to any of a plurality of positions, a pair of displaceable parts, a first and a second set of wedges in which the respective wedges are operative when displaced to effect displacement of the corresponding one of said parts, means connecting one of said parts to said code rod to convert the displacement thereof into rotational displacement of said code rod, means connected to the other of said parts to convert displacement thereof to translational displacement of said code rod, and means for displacing different ones of the respective wedges, said means including a non-return to zero mechanism whereby the wedges are not returned to zero if they are to partake in the positioning of the code rod in the ensuing cycle.

23. In a cyclically operated mechanism, a support, a set of wedges mounted on said support, the respective wedges being selectively displaceable from home positions, corresponding magnets mounted on the support, a toothed bar fixed on the support, a pair of similar bars slidably mounted on the support and reversely reciprocable from home positions, means operable when a magnet is energized to connect the corresponding wedge to the slide bar undergoing reciprocation from home position to effect displacement thereof, and other means operative if the magnet is energized in the following cycle to latch said wedge to said fixed bar to prevent the return of the wedge towards home position when the reciprocable slide by which it was displaced returns towards home position.

References Cited in the file of this patent

UNITED STATES PATENTS

| | | |
|---|---|---|
| 1,911,690 | Howard | May 30, 1933 |
| 2,129,065 | Loop | Sept. 6, 1938 |
| 2,432,364 | Wykes | Dec. 9, 1947 |
| 2,524,127 | Johnson | Oct. 3, 1950 |
| 2,550,644 | McCarthy | Apr. 24, 1951 |
| 2,681,614 | Rast | June 22, 1954 |
| 2,785,627 | Johnson | Mar. 19, 1957 |
| 2,785,628 | Furman | Mar. 19, 1957 |